July 31, 1956 J. W. HILL 2,756,959
FLUID-PRESSURE RESPONSIVE SPHINCTER VALVE
Filed July 25, 1951
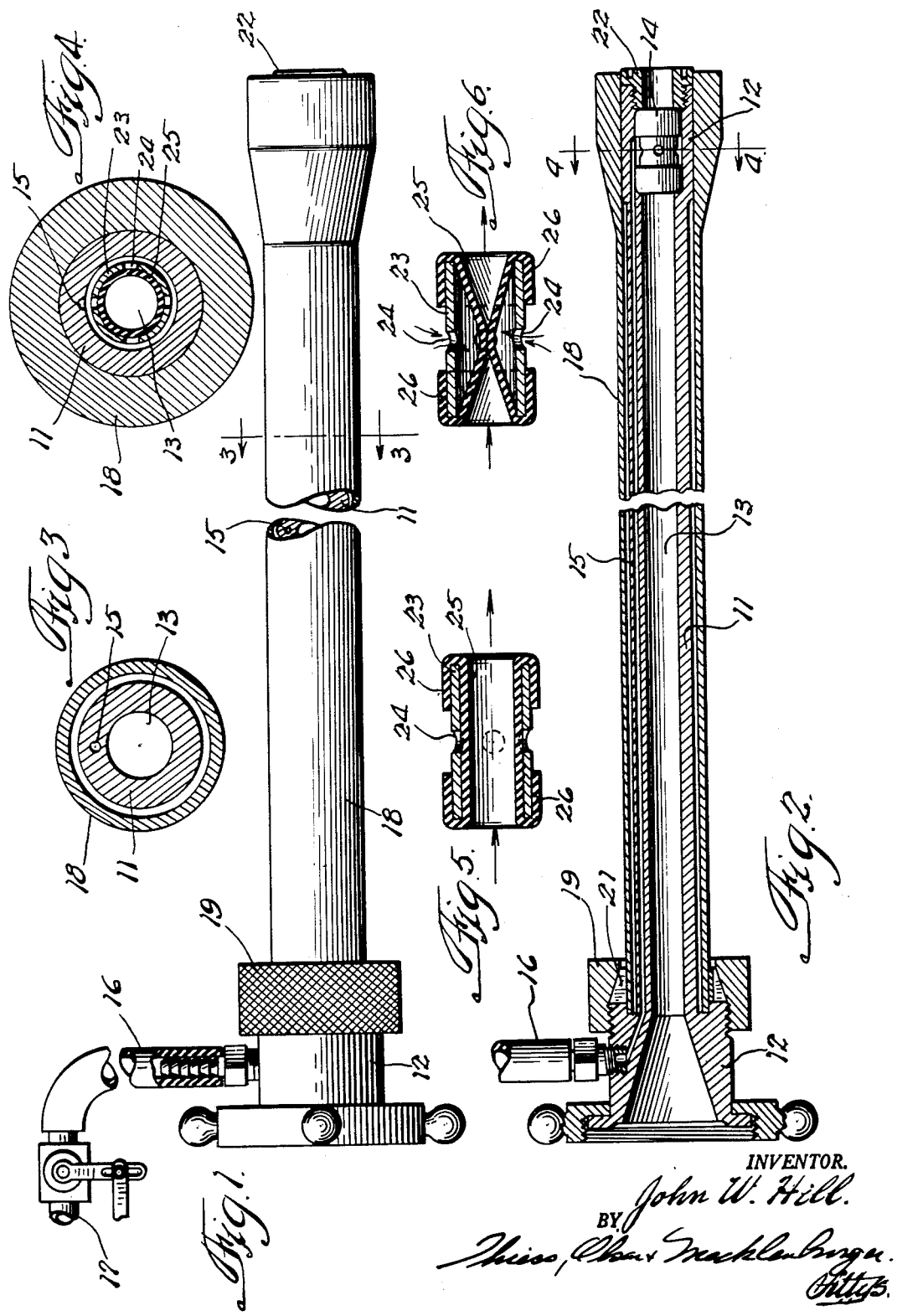
INVENTOR.
John W. Hill.

United States Patent Office 2,756,959
Patented July 31, 1956

2,756,959

FLUID-PRESSURE RESPONSIVE SPHINCTER VALVE

John W. Hill, Chicago, Ill., assignor to The Globe Company, Chicago, Ill., a corporation of Illinois Application July 25, 1951, Serial No. 238,493

10 Claims. (Cl. 251—5)

The present invention relates to a valve construction and has special reference to an iris or sphincter valve in which an adjustable diaphragm or other member about the valve opening may expanded or contracted to thereby control the operation of the valve.

More particularly, this invention relates to an iris valve which may be positioned in a tube or other conduit without necessitating breaking the conduit for the insertion of the valve. The diaphragm may be operated by air or other fluid under pressure without any control means projecting outwardly from the tube adjacent the valve. The present valve construction is very satisfactory where a frequently operated valve is required.

An object of the present invention is to provide an iris or sphincter valve having an adjustable member about the valve opening operable to open and close the valve.

Another object is to provide such a valve which may be inserted in a conduit from one end thereof without necessitating breaking the conduit.

Still another object is to provide a fluid-actuated iris or sphincter valve.

A further object is to provide such a valve which may be remotely controlled without any part extending externally of the conduit adjacent the valve.

A still further object is to provide a valve of the above type which may be substantially continuously operated to open and closed positions.

An additional object is to provide a valve having a generally smooth, unbroken material passageway therethrough.

Further objects and advantages will be apparent from the following description and claims when considered with the accompanying drawings, in which:

Fig. 1 is a side elevational view of the discharge spout of a filling and stuffing machine for handling plastic and other flowable materials, having a valve embodying the present invention employed therein;

Fig. 2 is a central, vertical, cross-sectional view, partially in elevation, of the construction shown in Fig. 1;

Fig. 3 is a transverse, cross-sectional view taken on the line 3—3 of Fig. 1;

Fig. 4 is a transverse, cross-sectional view taken on the line 4—4 of Fig. 2;

Fig. 5 is a central, vertical, cross-sectional view through the iris or sphincter valve showing the valve in open position; and Fig. 6 is a view similar to Fig. 5 with the valve in closed position.

Referring more particularly to the drawings, there is shown a discharge spout or horn of a filling machine having therein an iris or sphincter valve embodying the present invention. The spout illustrated comprises a material horn 11 having an enlarged inner end or base 12 with a central passageway 13 extending therethrough. The base 12 may be connected to any suitable source of material under pressure. The outer end of the material horn 11 is slightly enlarged, as shown at 12. The passageway 13 is also enlarged adjacent the outer end of the horn 11 for receiving the valve 14.

A fluid passageway 15 formed in the wall of the material horn 11 communicates at one end with an air inlet 16 controlled by a valve 17 and at the opposite or outer end with the valve 14. The inlet 16 may connected to a tank containing air or other fluid under pressure.

Positioned about the material horn 11 is a casing horn 18 arranged for easy insertion over, or removal from, the material horn 11. The inner diameter of the casing horn is preferably uniform throughout and is of a size to fit over the material horn. The inner end of the casing horn is secured to the base 12 of the material horn by a screw ring 19 and a tapered pressure washer 21.

The valve 14 may be inserted in the enlarged outer end of the material horn 11 and held therein by a tubular screw plug 22 threaded into the material horn outwardly of the valve 14. With this construction it is only necessary to remove the screw plug 22 to permit the ready insertion or removal of the valve 14.

The valve itself, shown particularly in Figs. 5 and 6, may comprise a substantially rigid tubular casing 23, preferably made of a suitable plastic or a noncorrosive metal, such as stainless steel. A plurality of spaced openings 24 are provided in the walls of the casing intermediate its ends. Positioned within the tubular casing 23 is a tubular member 25 which may be formed of flexible elastic material, such for example as natural or artificial rubber. The flexible tubular member, which preferably has an outer diameter substantially the same as the inner diameter of the tubular casing 23, is sealed to the tubular casing at each side of the openings 24.

Any suitable means of providing a substantially airtight seal between the periphery of the flexible member and the inner wall of the casing at each side of the holes 24 may be employed. In the embodiment shown, the elastic tubular member 25 is made longer than the casing 23, and the ends thereof are stretched and bent outwardly and back over the ends of the casing 23, forming a seal therewith. As illustrated in Fig. 2, the valve member is of a size to fit into the enlarged portion adjacent the outer end of the passageway 13. The overlapping ends 26 of the elastic tubular member are thus held in position and there is little likelihood of the seal between the tubular member 25 and the casing 23 being broken.

The valve 14 is positioned in the material horn 11 with the openings 24 in the tubular casing 23 in communication with the fluid passageway 15. In normal position the flexible tubular member 25 will lie adjacent the inner surface of the casing 23. However, when the valve 17 is opened and fluid under pressure enters the passageway 15 through the inlet 16 the fluid will pass through the openings 24 into the space between the casing and tubular member and force the portions of the flexible tubular member 25 together, as shown in Fig. 6, thus closing off the opening in the valve. When the valve 17 is thereafter opened to permit the escape of fluid to the atmosphere or a suitable sump provided therefor, the valve will be restored to its normal open position. In its preferred form, the inner dimensions of the flexible tubular member 25 are substantially the same as those of the conduit in which it is employed, thus providing a relatively smooth tubular passageway for the material when the valve is in open position.

The valve may be operated almost instantaneously to cut off the flow of the material through the conduit in which it is employed. It may also be alternated between open and closed position very rapidly over long periods of time. It is unnecessary to break the conduit or tube in which the valve is placed to permit its insertion and use, and no control means are required to project from the conduit adjacent the valve. This permits the valve to be remotely controlled with the conduit about the valve free from obstruction.

While a particular embodiment of this invention has been illustrated and described, it will be understood, of course, that the invention is not to be limited thereto, since many modifications may be made, and it is contemplated therefore by the appended claims to cover any such modifications as fall within the true spirit and scope of this invention.

I claim:

1. The combination with a tubular conduit having an enlarged inner portion extending inwardly from one end, of a tubular valve positioned entirely within said enlarged portion comprising an outer casing member having at least one perforation therein and an inner elastic member, said inner member being secured to said outer member on each side of said perforation by substantially airtight connections, the inner diameter of said elastic member normally being substantially the same as the inner diameter of said conduit adjacent the enlarged portion thereof and the end peripheral walls of said valve being of substantially the same dimension as the conduit walls thereabout, a longitudinally extending fluid supply passageway associated with said conduit communicating with said perforation, and means remote from said valve for controlling the flow of fluid to and from said perforation.

2. A valve construction comprising a substantially rigid cylindrical tubular casing having at least one perforation therein intermediate its ends, an elastic cylindrical tubular member of substantially uniform cross-sectional dimensions longer than said casing and having substantially the same outer cross-sectional dimensions throughout as the inner dimensions of said casing positioned in said casing, said elastic member having the ends thereof bent back over the ends of said casing substantially concentric thereto forming a substantially airtight connection therewith, the periphery of said valve with the bent over portions of said elastic member thereon being cylindrical and of uniform size with the intermediate portion of reduced size in communication with said perforation, whereby said valve may be positioned in a cylindrical conduit having an inner diameter substantially the same as the outer diameter of said valve.

3. The combination with a tubular conduit member having an enlarged inner portion adjacent one end with a longitudinally extending fluid supply passageway associated with said conduit communicating at one end with said enlarged portion, of a tubular valve positioned in said enlarged portion comprising a tubular casing having a perforation therein intermediate its ends and an elastic tubular member positioned in said casing with the periphery thereof secured for a substantial distance to said casing by substantially airtight connections on each side of said perforation, the periphery of said valve for a distance inwardly of its ends being of substantially the same size and shape as the inner surface of said enlarged conduit portion and forming a substantially fluid tight connection therewith, the intermediate circumferential portion of said valve being of reduced size and in communication with said perforation, and means for holding said valve in place in said conduit with the reduced circumferential portion of the valve casing in communication with the fluid supply passageway in said conduit.

4. The combination with a tubular conduit member having an enlarged inner portion adjacent one end with a longitudinally extending fluid supply passageway associated with said conduit communicating at one end with said enlarged portion, of a tubular valve positioned in said enlarged portion comprising a tubular casing having a perforation therein intermediate its ends and an elastic tubular member positioned in said casing with the periphery thereof secured for a substantial distance to said casing by substantially airtight connections on each side of said perforation, said valve having sealing rings on the periphery thereof extending inwardly from the ends of the casing for fitting into said enlarged conduit portion and forming a substantially fluid tight connection therewith and having an intermediate circumferential portion of reduced size intermediate said sealing rings in communication with said perforation, and means for holding said valve in place in said conduit with the reduced circumferential portion of the valve casing in communication with the fluid supply passageway in said conduit.

5. The combination with a tubular conduit member having an enlarged inner portion adjacent one end with a longitudinally extending fluid supply passageway associated with said conduit communicating at one end with said enlarged portion, of a tubular valve positioned in said enlarged portion comprising a tubular casing having a perforation therein intermediate its ends and an elastic tubular member longer than said casing positioned therein with the ends thereof bent back over the outer ends of said casing, the ends of said valve with the bent over ends of the casing thereon being of a size to fit the inner side of said enlarged conduit portion and form a substantially fluid tight connection therewith, the peripheral portion of said valve intermediate the bent over ends of said casing being of reduced size and in communication with said perforation, and means for holding said valve in place in said conduit with the reduced circumferential portion of the valve casing in communication with the fluid supply passageway in said conduit.

6. A valve construction for insertion into a conduit comprising a rigid tubular casing having at least one perforation therein intermediate its ends, a flexible tubular member positioned in said casing with the periphery thereof secured for a substantial distance to said casing by substantially airtight connections on each side of said perforation, said valve having sealing rings about the periphery thereof extending outwardly from said casing, said sealing rings being positioned on each side of said perforation forming therebetween a circumferential groove in communication with said perforation.

7. A valve construction for insertion into a conduit comprising a rigid tubular casing having at least one perforation therein intermediate its ends, an elastic tubular member of substantially uniform cross-sectional dimensions positioned in said casing with the periphery thereof secured for a substantial distance to said casing by substantially airtight connections on each side of said perforation, said valve having sealing rings about the periphery thereof extending outwardly from said casing, said sealing rings being positioned on each side of said perforation forming therebetween a circumferential groove in communication with said perforation.

8. The combination with a tubular conduit having a longitudinally extending fluid supply passageway associated with said conduit, of a tubular valve positioned in said conduit comprising a substantially rigid tubular casing having at least one perforation therein intermediate its ends, an elastic tubular member positioned in said casing with the periphery thereof secured for a substantial distance to said casing by substantially airtight connections on each side of said perforation, said valve having sealing rings on the periphery thereof extending outwardly from said casing engaging the surrounding walls of said enlarged conduit portion, said sealing rings being positioned on each side of said perforation forming therebetween a circumferential groove in communication with said perforation, and means for holding said valves in place in said conduit with said circumferential groove in communication with said fluid supply passageway.

9. The combination with a tubular conduit of a tubular valve positioned in said conduit comprising a substantially rigid tubular casing having at least one perforation therein intermediate its ends, a flexible tubular member positioned in said casing with the periphery thereof secured for a substantial distance to said casing by substantially airtight connections on each side of said perforation, said valve having sealing rings on the periphery thereof extending outwardly from said casing engaging the surrounding walls of said enlarged conduit portion, said sealing rings being positioned on each side of said perforation forming therebetween a circumferential groove in communication with said perforation, a longitudinally extending fluid-supply passageway associated with said conduit communicating with said circumferential groove, and means remote from said valve for controlling the flow of fluid to and from said groove.

10. A valve construction for insertion into a conduit comprising a rigid tubular casing having at least one perforation therein intermediate its ends, an elastic tubular member longer than said casing positioned therein, said elastic tubular member having the ends thereof bent back over the ends of said casing substantially concentric thereto forming a substantially airtight connection therewith, said valve having sealing rings about the periphery thereof extending outwardly from said casing, said sealing rings being positioned on each side of said perforation forming therebetween a circumferential groove in communication with said perforation.

References Cited in the file of this patent

UNITED STATES PATENTS

| | | |
|---|---|---|
| 614,968 | Mohs | Nov. 29, 1898 |
| 2,247,363 | Dunn | July 1, 1941 |
| 2,487,226 | Eastman | Nov. 8, 1949 |
| 2,518,625 | Langstaff | Aug. 15, 1950 |
| 2,573,712 | Kallam | Nov. 6, 1951 |
| 2,575,240 | Thompson | Nov. 13, 1951 |
| 2,587,188 | McFadden | Feb. 26, 1952 |
| 2,590,215 | Sausa | Mar. 25, 1952 |
| 2,604,246 | Hood | July 22, 1952 |

FOREIGN PATENTS

| | | |
|---|---|---|
| 540,685 | Great Britain | Oct. 27, 1941 |